(12) United States Patent
Noto

(10) Patent No.: US 11,288,035 B2
(45) Date of Patent: Mar. 29, 2022

(54) AUDIO SIGNAL PROCESSOR AND METHOD OF PROCESSING AUDIO SIGNAL

(71) Applicant: Yamaha Corporation, Hamamatsu (JP)

(72) Inventor: Kentaro Noto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/853,409

(22) Filed: Apr. 20, 2020

(65) Prior Publication Data

US 2020/0249907 A1 Aug. 6, 2020

Related U.S. Application Data

(63) Continuation of application No. PCT/JP2017/038141, filed on Oct. 23, 2017.

(51) Int. Cl.
*G06F 3/16* (2006.01)
*H04S 1/00* (2006.01)
*H04S 7/00* (2006.01)
*G06F 3/04847* (2022.01)

(52) U.S. Cl.
CPC ............ *G06F 3/165* (2013.01); *G06F 3/162* (2013.01); *H04S 1/002* (2013.01); *H04S 7/30* (2013.01); *G06F 3/04847* (2013.01)

(58) Field of Classification Search
CPC ...... G06F 3/165; G06F 3/162; G06F 3/04847; H04S 1/002; H04S 7/30
See application file for complete search history.

(56) References Cited

U.S. PATENT DOCUMENTS

| | | | | |
|---|---|---|---|---|
| 5,930,375 A | * | 7/1999 | East | H04H 60/04 381/119 |
| 6,218,971 B1 | * | 4/2001 | Sugihara | H04H 60/04 341/110 |
| 2002/0085642 A1 | * | 7/2002 | Kunikata | G10H 1/0058 375/260 |
| 2013/0230194 A1 | | 9/2013 | Terada et al. | |

FOREIGN PATENT DOCUMENTS

| | | |
|---|---|---|
| JP | 2006-270667 A | 10/2006 |
| JP | 2007-194906 A | 8/2007 |
| JP | 2008-67039 A | 3/2008 |
| JP | 2013-48329 A | 3/2013 |
| JP | 2015-213246 A | 11/2015 |

OTHER PUBLICATIONS

International Search Report (PCT/ISA/210) issued in PCT Application No. PCT/JP2017/038141 dated Dec. 19, 2017 with English translation (four pages).
Japanese-language Written Opinion (PCT/ISA/237) issued in PCT Application No. PCT/JP2017/038141 dated Dec. 19, 2017 (five pages).

* cited by examiner

*Primary Examiner* — Joseph Saunders, Jr.
(74) *Attorney, Agent, or Firm* — Crowell & Moring LLP

(57) ABSTRACT

An audio signal processor includes a first block including a first input interface and a first output interface, and a second block including a second input interface and a second output interface. The audio signal processor further includes a routing matrix that is connected to each of the first input interface, the first output interface, the second input interface, and the second output interface. The routing matrix outputs a signal inputted from each of the first output interface and the second output interface, to each of the first input interface and the second input interface.

12 Claims, 13 Drawing Sheets

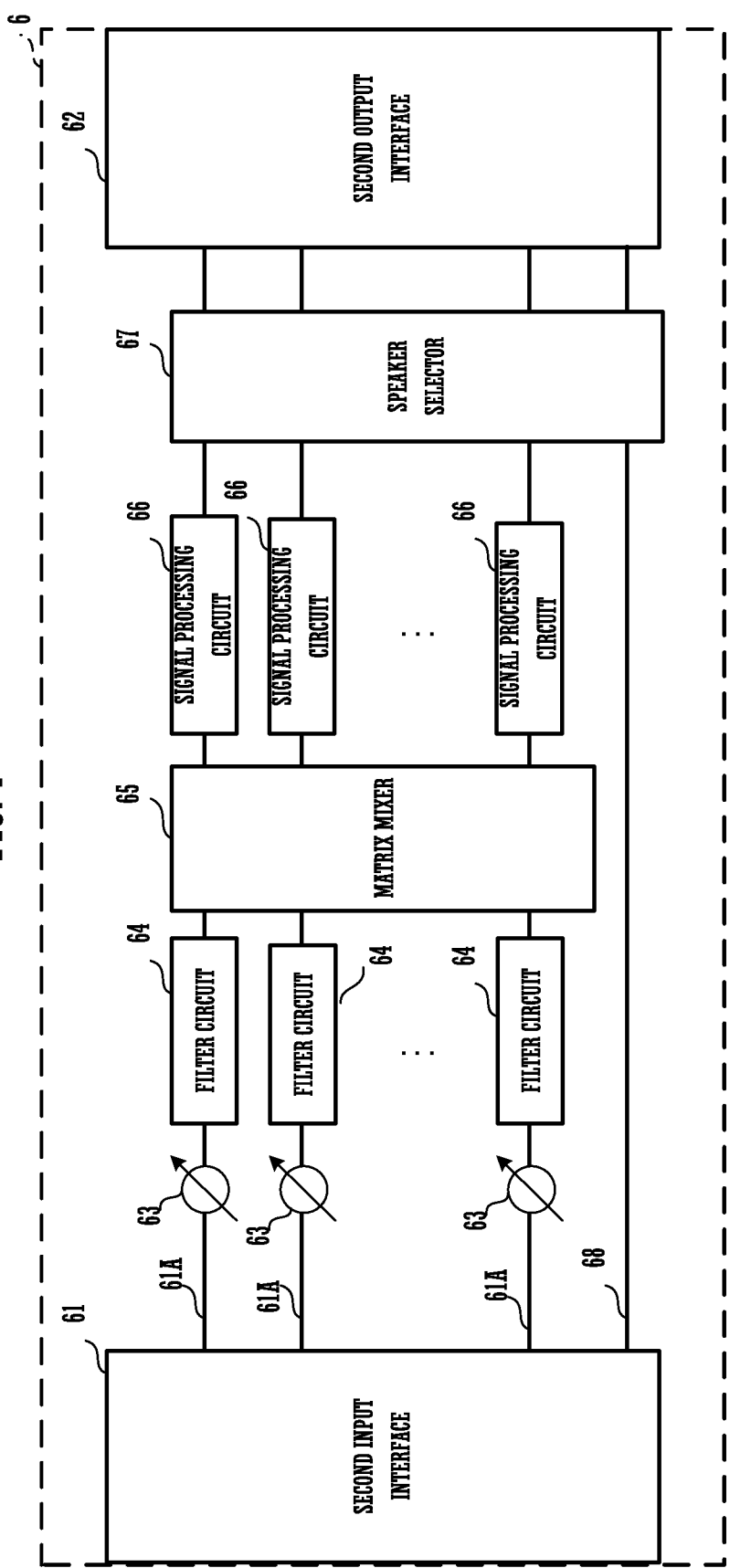

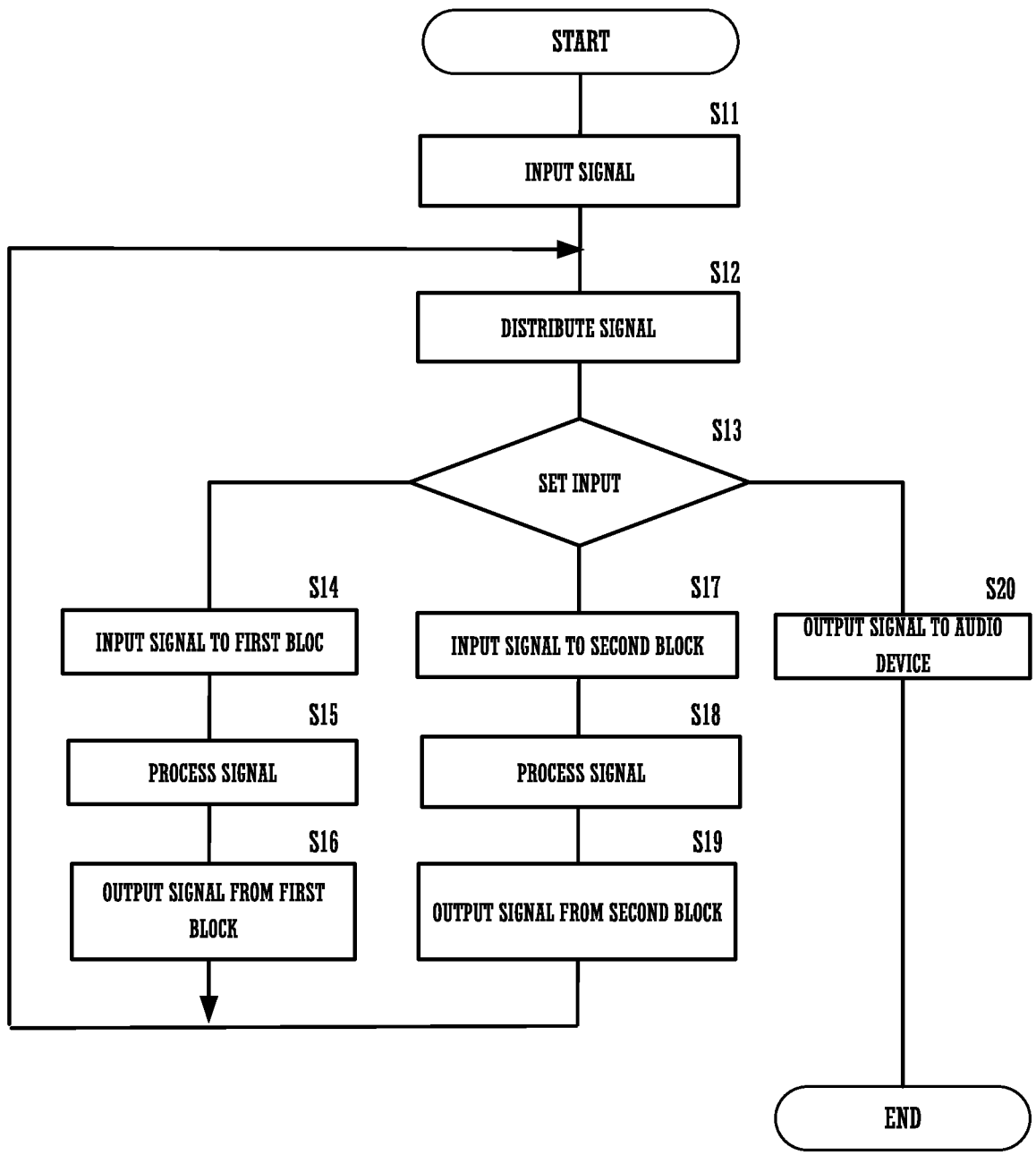

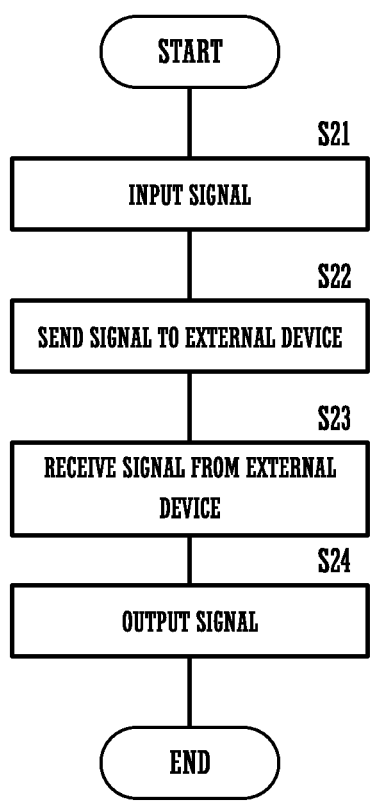

AUDIO SIGNAL PROCESSOR AND METHOD OF PROCESSING AUDIO SIGNAL

CROSS REFERENCE TO RELATED APPLICATIONS

The present application is a continuation of International Application No. PCT/JP2017/038141, filed on Oct. 23, 2017, the entire contents of which are incorporated herein by reference.

BACKGROUND OF THE INVENTION

1. Field of the Invention

Embodiments of the present invention relate to an audio signal processor and a method of processing an audio signal, and, in particular, to an audio signal processor and a method of processing an audio signal that process a signal.

2. Description of the Related Art

Conventionally, a mixing system collects by a microphone sound played by a musical instrument or vocal sound, mixes the sound, and sends the mixed sound to a power amplifier and various types of recording devices. These mixing systems include a mixed bus. The mix bus includes the M number of buses, and, in each of the M number of buses, one or more input channel signals selectively inputted from any input channel among the N number of input channels are mixed, which results in a total of M ways of mixed outputs. The mixed outputs from each of the M number of mix buses are outputted to output channels of an output channel portion having M number of channels.

Incidentally, an audio signal processor and a method of processing an audio signal that are able to more flexibly perform signal processing have been demanded. Furthermore, an audio signal processor and a method of processing an audio signal that do not require a plurality of pieces of equipment and are able to reduce processing such as wiring have been demanded.

SUMMARY OF THE INVENTION

In view of the foregoing, an object of the embodiments of the present invention is to provide an audio signal processor and a method of processing an audio signal that perform flexible signal processing, in one structure.

An audio signal processor according to an embodiment of the present invention includes a first block including a first input interface and a first output interface, and a second block including a second input interface and a second output interface. The audio signal processor according to an embodiment of the present invention further includes a routing matrix connected to each of the first input interface, the first output interface, the second input interface, and the second output interface, and outputting a signal inputted from each of the first output interface and the second output interface, to each of the first input interface and the second input interface.

According to an audio signal processor and a method of processing an audio signal of an embodiment of the present invention, flexible signal processing is able to be performed in one structure.

The above and other elements, features, steps, characteristics and advantages of the present invention will become more apparent from the following detailed description of the preferred embodiments with reference to the attached drawings, in which:

BRIEF DESCRIPTION OF THE DRAWINGS

FIG. 7 is a block configuration diagram showing a second block;

FIG. 12 is a flow chart showing a method of processing an audio signal; and

FIG. 13 is a flow chart showing the method of processing an audio signal in the first block.

DETAILED DESCRIPTION OF EMBODIMENTS

An audio signal processor 1 according to an embodiment of the present invention will be described with reference to FIG. 1 to FIG. 8. The audio signal processor 1 is a device (a system) for producing music to be used at a music studio or a private home, for example. The audio signal processor 1 outputs an inputted signal on which signal processing that a user desires has been performed by using a PC or a mobile terminal.

The audio signal processor 1 includes a plurality of functions. The audio signal processor 1 includes a monitor control function, a communication function (processing of a talk-back signal), a channel strip function (signal processing of a channel), and a monitor alignment function (processing of a monitor signal). Such functions are conventionally performed by individual devices (equipment) used while being connected to each other. The audio signal processor 1 according to an embodiment of the present invention stores the functions in one housing (a structure) 4 (see FIG. 3). The audio signal processor 1 is connected to a PC, a mobile terminal, or the like (hereinafter simply referred to as a PC 100). The audio signal processor 1 achieves a monitor control function, a communication function, a channel strip function, and a monitor alignment function, when a user operates the PC 100. Therefore, the audio signal processor 1 according to an embodiment does not require a plurality of pieces of equipment, and is able to reduce wiring work by a user.

Figure 1:
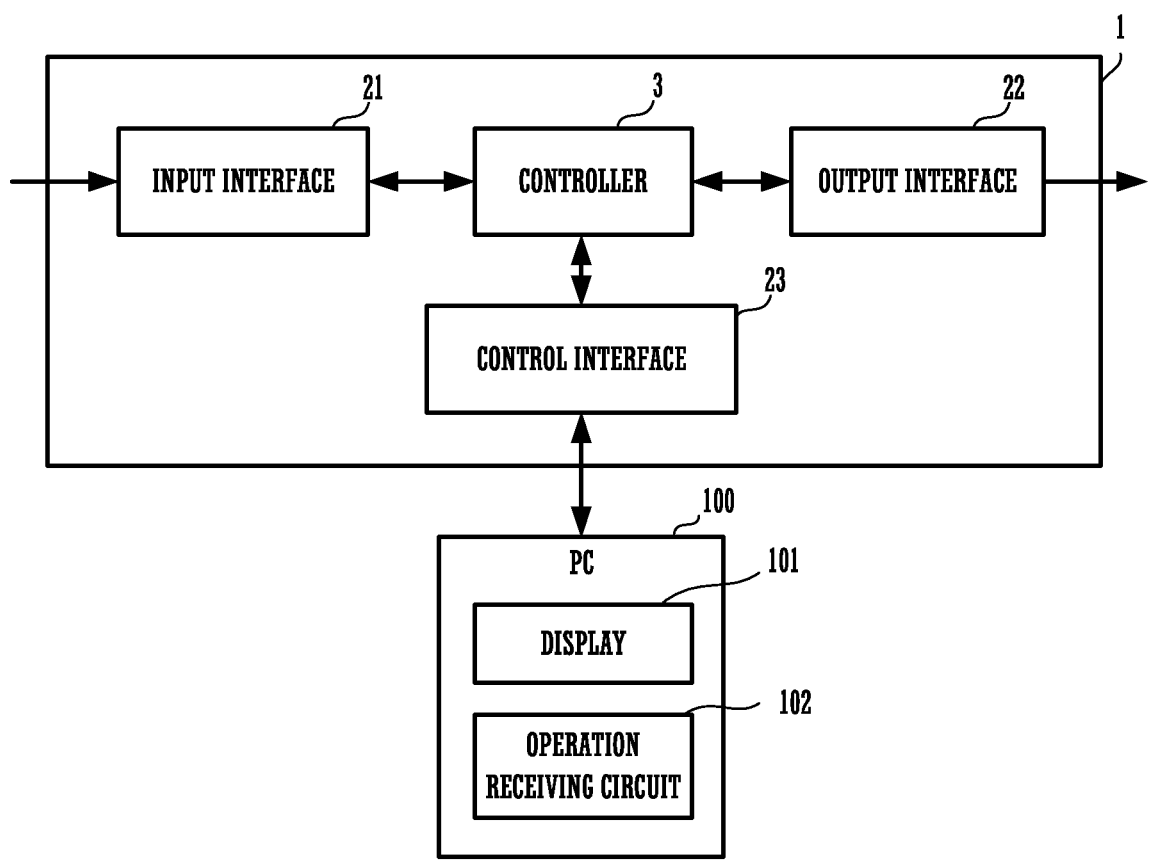
FIG. 1 is a block diagram showing an overview of a hardware configuration of an audio signal processor.
Figure 2:
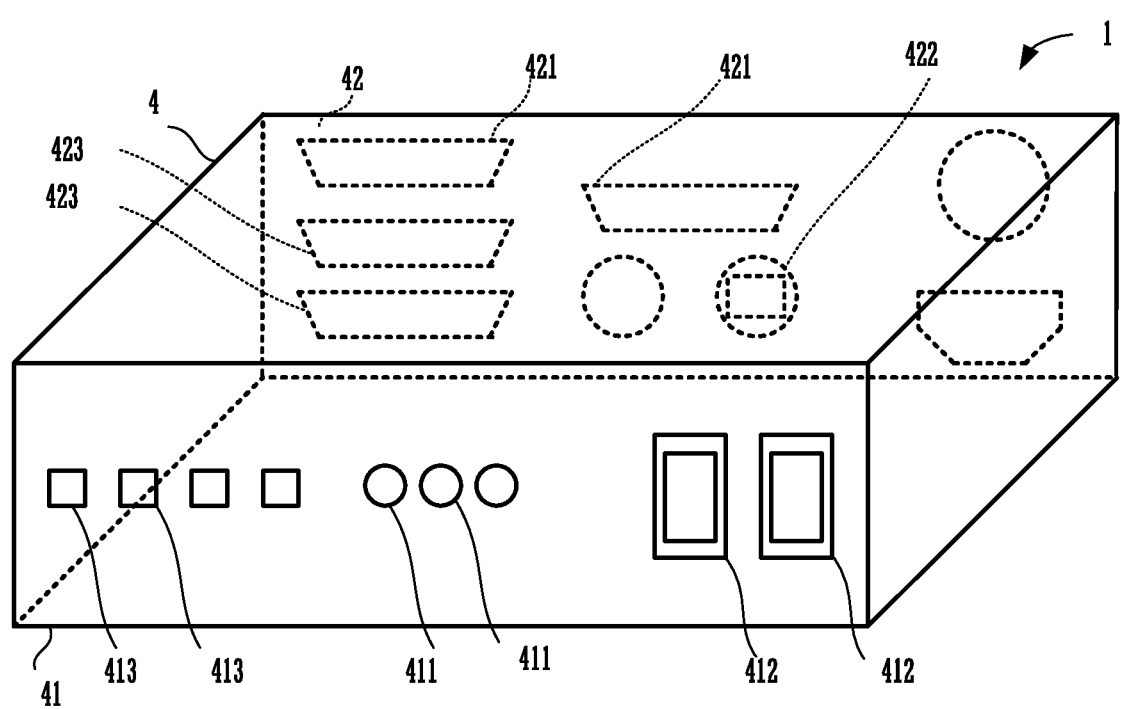
FIG. 2 is a perspective view showing a housing of the audio signal processor.
Figure 3:
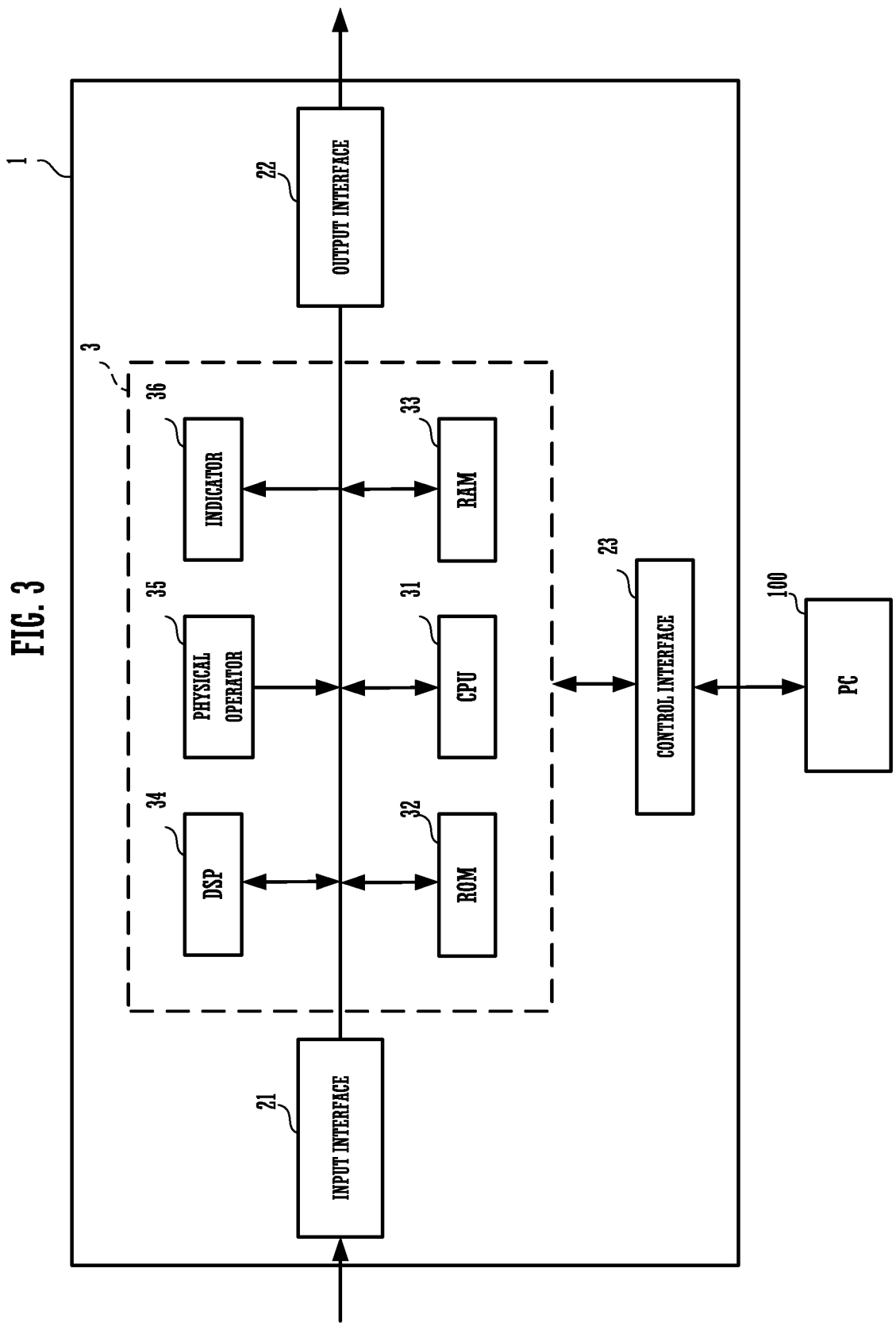
FIG. 3 is a block diagram showing a hardware configuration of the audio signal processor.

The hardware configuration of the audio signal processor 1 will be described with reference to FIG. 1, FIG. 2, and FIG. 3. FIG. 1 is a block diagram showing an overview of the hardware configuration of the audio signal processor 1. FIG. 2 is a perspective view showing a housing 4 of the audio signal processor 1. FIG. 3 is a block diagram showing the hardware configuration of the audio signal processor 1. The audio signal processor 1, as shown in FIG. 1, includes an input interface 21, a controller 3, an output interface 22, and a control interface 23.

The input interface 21 is connected to a plurality of audio devices such as musical instruments or microphones, for example. A signal is inputted from the plurality of audio devices to the input interface 21. In other words, a signal is inputted from a plurality of sound sources to the input interface 21. It is to be noted that the input interface 21 may be connected to a plurality of audio devices (sound sources) through an interface device or a similar device to which the plurality of audio devices (sound sources) are connected. The input interface 21, as shown in FIG. 2, for example, may be connected to the plurality of audio devices (sound sources) or the interface device to which the plurality of audio devices (sound sources) are connected through each input terminal 421 disposed on a back panel 42 of the housing 4. In addition, for example, as shown in FIG. 2, a connector 422 for LAN is provided on the back panel 42 of the housing 4. The input interface 21 may be connected to the plurality of audio devices (sound sources) via LAN through the connector 422 for LAN.

The output interface 22 is connected to a plurality of audio devices such as speakers, for example. The output interface 22 outputs a signal on which signal processing has been performed, to the plurality of audio devices. The output interface 22 is connected to the plurality of audio devices through an output terminal 423 provided on the back panel 42 of the housing 4, for example. In addition, for example, the output interface 22 may be connected to the plurality of audio devices via LAN through the connector 422 for LAN.

The control interface 23, as shown in FIG. 1, is disposed between the PC 100 and the controller 3. The control interface 23 receives a signal inputted from peripheral equipment (an operation receiving circuit 102 to be described later) such as a keyboard or a mouse included in or connected to the PC 100. The control interface 23 outputs the signal received from the PC 100 to the controller 3. In addition, the control interface 23 outputs the signal received from the controller 3, to the PC 100.

It is to be noted that the audio signal processor 1 may include at least one of the display 101 and the operation receiving circuit 102.

The controller 3, as shown in FIG. 3, includes a CPU 31, a ROM 32, a RAM 33, and a DSP (Digital Signal Processor) 34, a physical operator 35, and an indicator 36.

The physical operator 35, as shown in FIG. 2, includes an ON-OFF button 411 and a power switch 412 that are provided on a front panel 41 of the housing 4.

The indicator 36 displays a state of power ON or power OFF, a status of signal processing, and a status of an input and output, for example. The indicator 36 notifies a user of the state of power ON or power OFF, the status of signal processing, and the status of an input and output, for example, by lighting a light emitting element 413 or the like of the front panel 41 of the housing 4. The user can easily know the status of signal processing and the status of an input and output, by the indicator 36. It is to be noted that the housing 4 may include an LCD (Liquid Crystal Display) screen (not shown).

The CPU 31 performs various types of processing to control the ROM 32, the RAM 33, the DSP 34, the physical operator 35, and the indicator 36. The ROM 32 is a storage medium. The ROM 32 stores a program for operating the CPU 31. The CPU 31 performs various types of processing by reading the program that operates the CPU 31 and is stored in the ROM 32, to the RAM 33, and executing the program.

The CPU 31, as shown in FIG. 3, receives an operation from the PC 100 connected via LAN, for example, through the control interface 23. The PC 100 includes an operation receiving circuit 102 such as a keyboard, a mouse, or a GUI (Graphical User Interface). A user operates the operation receiving circuit 102, and then the CPU 31 causes the DSP 34 to execute signal processing that the user desires. It is to be noted that the operation receiving circuit 102 may be electrically connected to the PC 100.

The DSP 34 performs various types of signal processing on an inputted signal. The DSP 34 performs the signal processing according to instructions of the CPU 31.

Figure 4:
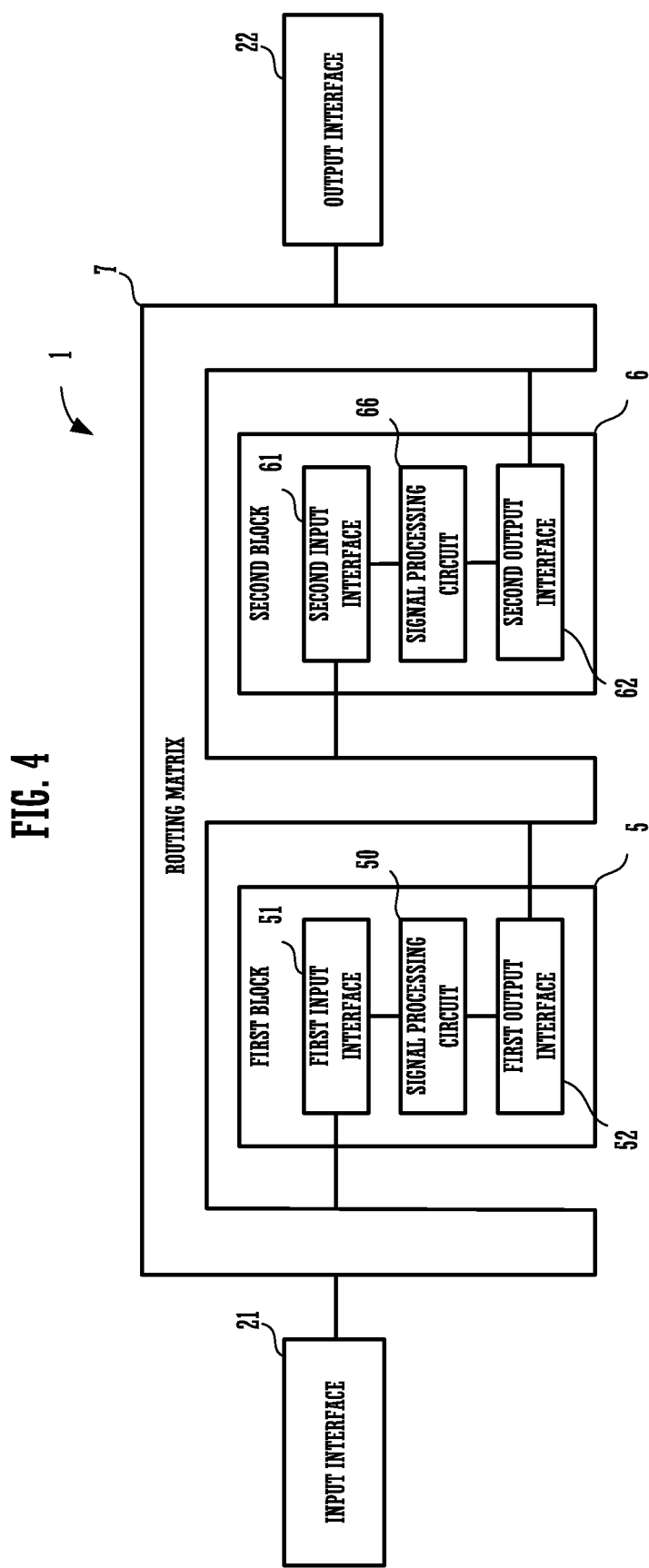
FIG. 4 is a block diagram showing an entire configuration of the audio signal processor.
Figure 5:
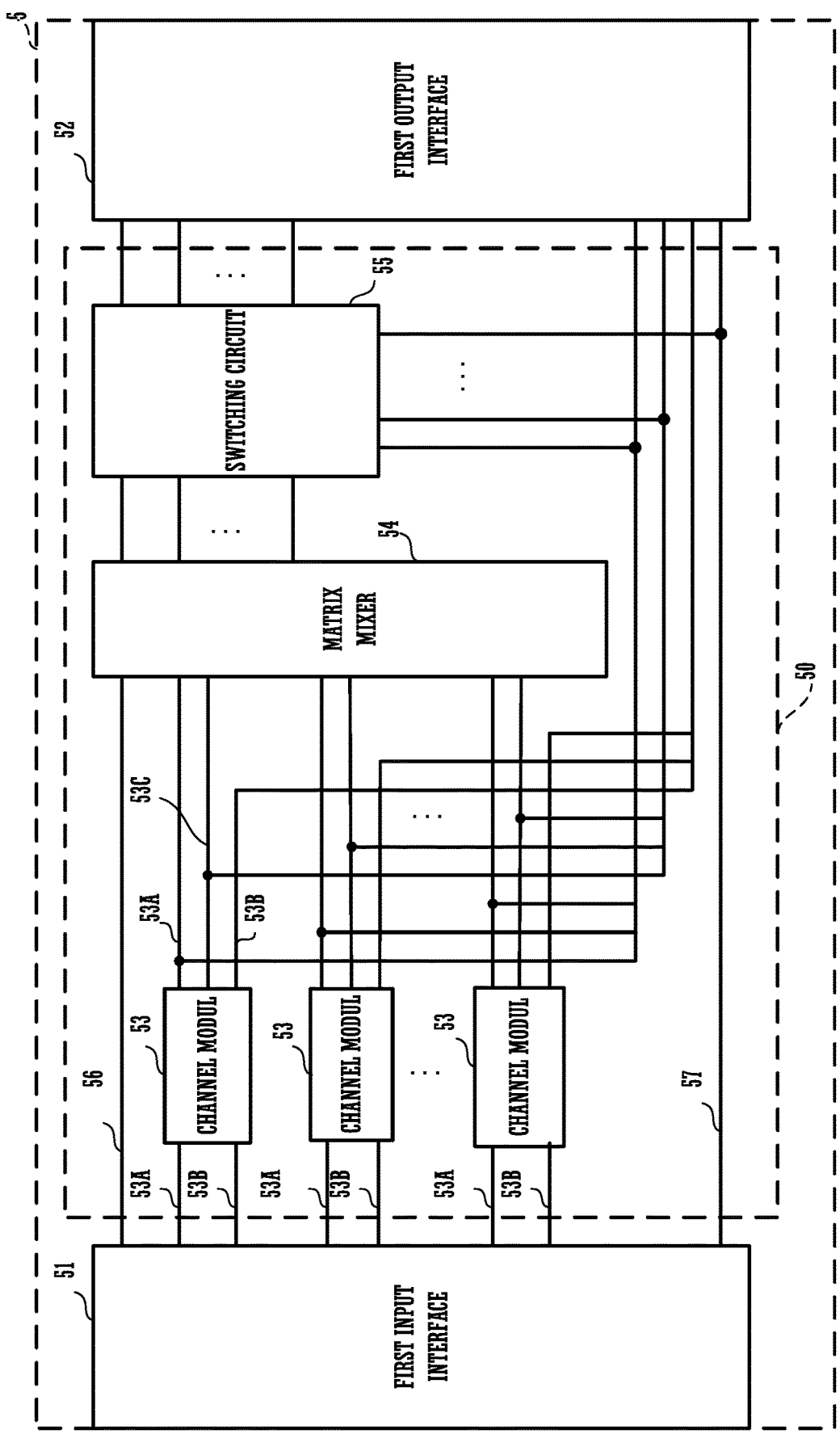
FIG. 5 is a block diagram showing a configuration of a first block.
Figure 6:
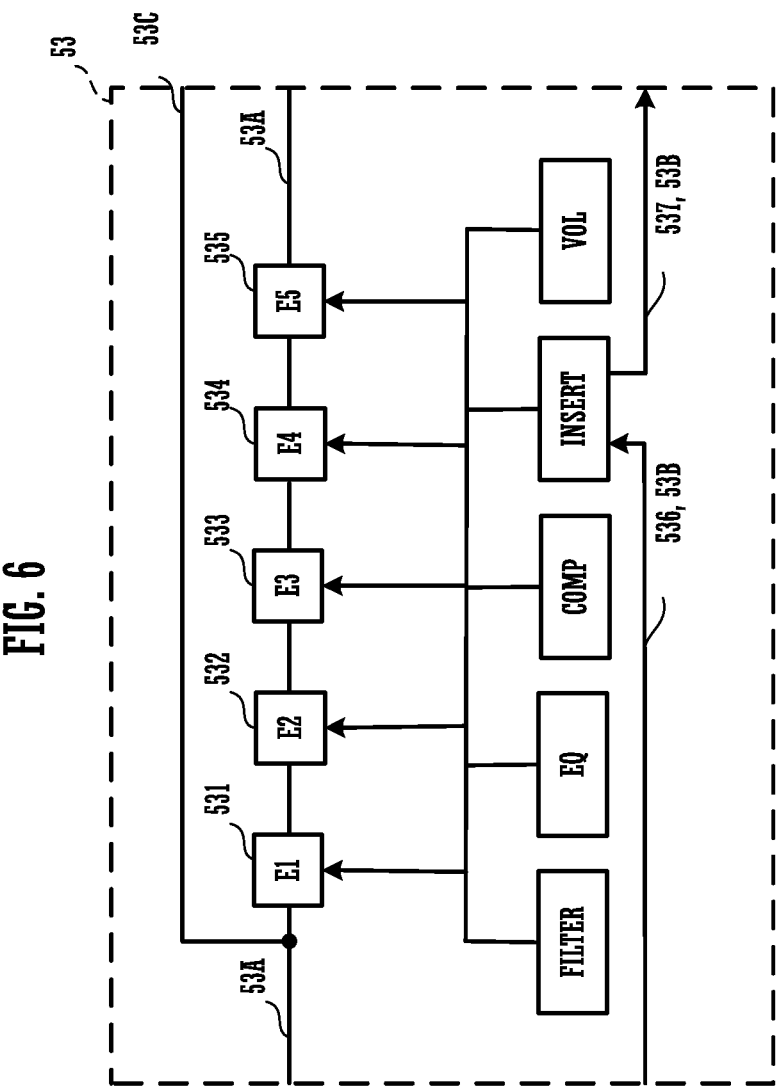
FIG. 6 is a block configuration diagram showing each channel module of the first block.
Figure 8A:
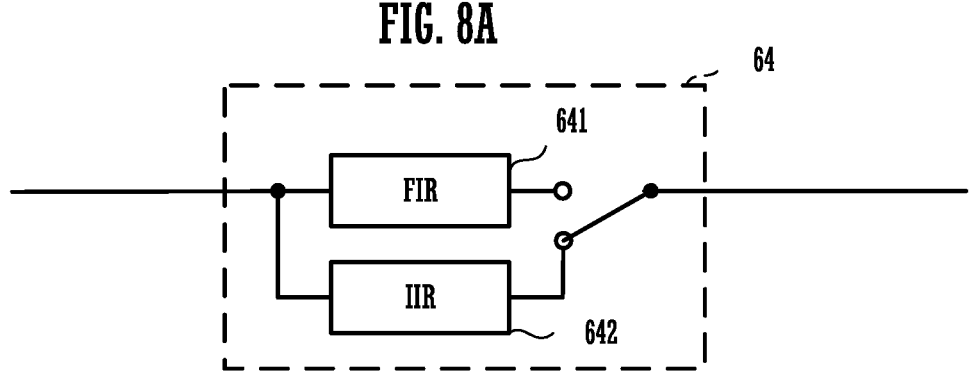
FIG. 8A is a block configuration diagram showing a filter circuit of the second block.
Figure 8B:
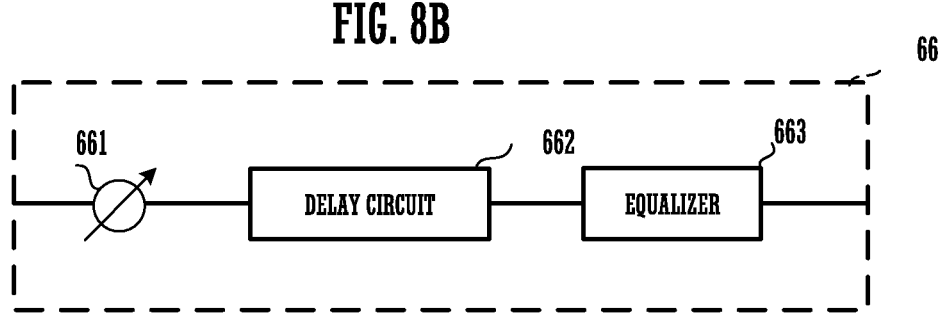
FIG. 8B is a block configuration diagram showing a signal processing circuit of the second block.

A system configuration of the audio signal processor 1 according to an embodiment of the present invention will be described with reference to FIG. 4 to FIG. 8. The various configurations and signal processing to be described below are achieved mainly by the operation of the CPU 31 and the DSP 34. FIG. 4 is a block diagram showing an entire configuration of the audio signal processor 1. FIG. 5 is a block diagram showing a configuration of a first block 5. FIG. 6 is a block configuration diagram showing each channel module 53 of the first block 5. FIG. 7 is a block configuration diagram showing a second block 6. FIG. 8A is a block configuration diagram showing a filter circuit 64 of the second block 6, and FIG. 8B is a block configuration diagram showing a signal processing circuit 66 of the second block 6.

The audio signal processor 1, as shown in FIG. 4, includes a first block (an input block) 5, a second block (an output block) 6, and a routing matrix 7.

The first block 5 includes a first input interface 51 and a first output interface 52. In addition, the second block 6 includes a second input interface 61 and a second output interface 62. The routing matrix 7 is connected to each of the first input interface 51, the first output interface 52, the second input interface 61, and the second output interface 62.

The routing matrix 7 inputs a signal outputted from each of the first output interface 52 and the second output interface 62, to each of the first input interface 51 or the second input interface 61. In addition, the routing matrix 7 receives a signal outputted from the input interface 21. Furthermore, the routing matrix 7 outputs a signal to the output interface 22.

More specifically, the routing matrix 7 inputs a signal outputted from the first output interface 52, to the first input interface 51, the second input interface 61, or the output interface 22. Similarly, the routing matrix 7 inputs a signal outputted from the second output interface 62, to the first input interface 51, the second input interface 61, or the output interface 22. Furthermore, the routing matrix 7 outputs a signal inputted from the input interface 21, to the first input interface 51, the second input interface 61, or the output interface 22.

It is to be noted that the routing matrix 7 receives an analog signal, or a digital signal by the digital audio signal transmission standard, such as AES/EBU, for example, from the input interface 21. The input and output of a signal in the routing matrix 7 are controlled when a user operates the PC 100.

The first block 5, as shown in FIG. 4 and FIG. 5, further includes a signal processing circuit 50. The signal processing circuit 50 includes a plurality of channel modules (digital signal processors) 53, a matrix mixer 54, and a switching circuit 55.

The first input interface 51 receives a signal from the routing matrix 7 (see FIG. 4), and outputs the received signal to each of the plurality of channel modules 53 (see FIG. 5).

The plurality of channel modules 53, as shown in FIG. 5, correspond to a plurality of buses of the routing matrix 7. An input bus 53A is interposed for each channel, between the first input interface 51 and the plurality of channel modules 53. Each of the plurality of channel modules 53 receives a source signal for each channel from the routing matrix 7 through the input bus 53A. In addition, an insert bus 53B is interposed for each channel, between the first input interface 51 and the plurality of channel modules 53. Each of the plurality of channel modules 53 receives an insert signal for each channel from the routing matrix 7 through the insert bus 53B.

It is to be noted that a user operates the operation receiving circuit 102 of the PC 100, and selects a signal to input to each of the plurality of channel modules 53 from the routing matrix 7. As a result, a signal that the user desires is selectively inputted to each of the plurality of channel modules 53 through the first input interface 51.

Each of the plurality of channel modules 53 receives a signal corresponding to each channel from the first input interface 51 through the input bus 53A. As shown in FIG. 6, a plurality (five) of effector processing circuits (a first effector processing circuit 531 (E1), a second effector processing circuit 532 (E2), a third effector processing circuit 533 (E3), a fourth effector processing circuit 534 (E4), and a fifth effector processing circuit 535 (E5)), for example, perform effector processing on the signal that each of the plurality of channel modules 53 has received. Each of the plurality of effector processing circuits is able to execute a filter function, an equalizer (EQ) function, a compression (COMP) function, an insertion function, and a volume adjustment (VOL) function, and a user can select one of the functions. For example, the user can make a setting so that the first effector processing circuit 531 may correspond to the filter function.

It is to be noted that the number of effect processing circuits may not be limited to five, and may be four or less or six or more. In addition, each of the effect processing circuits may be corresponded to a function other than the filter function, the equalizer (EQ) function, the compression (COMP) function, the insertion function, and the volume adjustment (VOL) function.

In the present preferred embodiment, the first effector processing circuit 531 corresponds to the filter function, and performs filter processing on an inputted signal. The second effector processing circuit 532 corresponds to the equalizer function, and performs equalizer processing on an inputted signal. The third effector processing circuit 533 corresponds to the compression function, and performs compression processing on an inputted signal. The fourth effector processing circuit 534 corresponds to the insertion function, and performs processing on a signal by an external device. The fifth effector processing circuit 535 corresponds to the volume adjustment function, and adjusts the volume of a signal.

Each of the plurality of channel modules 53 applies effector processing to a signal by the first effector processing circuit 531, the second effector processing circuit 532, the third effector processing circuit 533, the fourth effector processing circuit 534, and the fifth effector processing circuit 535, and outputs the signal processed to the output side of the input bus 53A.

Incidentally, each of the plurality of channel modules 53 sends and receives a signal to and from an external device through the insert bus 53B used in the insertion function. The insert bus 53B includes an insertion return 536 and an insertion send 537. The insert bus 53B is connected to the input bus 53A when the user selects the insertion function. The external device is an effector processor, for example. In each of the plurality of channel modules 53, the insertion function outputs a signal of the input bus 53A to the external device through the insertion send 537 of the insert bus 53B. The insertion function receives an insertion signal on which signal processing has been performed by the external device, through the insertion return 536 of the insert bus 53B. In other words, each of the plurality of channel modules 53 uses the insertion function, receives the insertion signal on which signal processing has been performed by the external device, and outputs the received signal from the output side of the input bus 53A.

The external device is connected to each of the plurality of channel modules 53 through the routing matrix 7. More specifically, the signal of the input bus 53A is outputted to the routing matrix 7 through the insertion send 537 of the insert bus 53B, and the first output interface 52. In addition, the signal on which signal processing has been performed by the external device and which has been outputted to the routing matrix 7 is inputted to the routing matrix 7. The signal on which signal processing has been performed by the external device is returned to one of the plurality of channel modules 53 that has sent the signal, through the first input interface 51 and the insertion return 536 of the insert bus 53B. As a result, the user can insert any signal processing function of an external device in any position on the input bus 53A of each of the plurality of channel modules 53 (see FIG. 4).

Each of the plurality of channel modules 53 outputs a post-fader signal on which the effector processing by the first effector processing circuit 531, the second effector processing circuit 532, the third effector processing circuit 533, the fourth effector processing circuit 534, and the fifth effector processing circuit 535 has been performed, through the input bus 53A. In addition, each of the plurality of channel modules 53 outputs a pre-fader signal that is a signal before (preceding) the above-described effector processing is performed, through a pre-fader bus 53C.

The matrix mixer 54, as shown in FIG. 5, receives a signal outputted from each of the plurality of channel modules 53. More specifically, the matrix mixer 54 receives a pre-fader signal and a post-fader signal that have been outputted from each of the plurality of channel modules 53. In other words, the matrix mixer 54 receives a pre-fader signal from each of the plurality of channel modules 53 through the pre-fader bus 53C. In addition, the matrix mixer 54 receives a post-fader signal from each of the plurality of channel modules 53 through the input bus 53A.

The matrix mixer 54 includes a plurality of buses. In other words, the matrix mixer 54 performs processing such as mixing signals received from each of the plurality of channel modules 53, distributes the signals according to the number of channels of the first output interface 52, and outputs the signals to the switching circuit 55. In addition, the matrix mixer 54 is able to select to input either a pre-fader signal or a post-fader signal. Furthermore, the matrix mixer 54 receives a monitor source signal from the first input interface 51.

The switching circuit 55 includes a combination of a plurality of single-pole double-throw switches. The switching circuit 55, for each channel of the first output interface 52, selects either a signal (a post-fader signal to be outputted through the input bus 53A, a pre-fader signal to be outputted through the pre-fader bus 53C) preceding the matrix mixer 54 or a signal following the matrix mixer 54. The switching circuit 55 outputs a signal for a monitor to the first output interface 52, for each channel of the first output interface 52. The user can output a desired signal for each channel of the first output interface 52 from the switching circuit 55 to the first output interface 52, by operating the operation receiving circuit 102 of the PC 100.

The first output interface 52 receives the signal for a monitor outputted from the switching circuit 55, for each channel. In addition, the first output interface 52 receives a pre-fader signal and a post-fader signal that have been outputted for each of the plurality of channel modules 53.

Furthermore, the first output interface 52 receives an insertion signal that has been outputted for each of the plurality of channel modules 53. Then, the first output interface 52 outputs the received signal to the routing matrix 7.

It is to be noted that the first block 5 is connected to a monitor source bus (a Cue function bus) 56 including a plurality of channels, and a talk-back bus 57 including a plurality of channels. The first block 5 outputs a monitor source signal to the first output interface 52 through the monitor source bus 56. The first block 5 outputs a talk-back signal to the first output interface 52 through the talk-back bus 57. In addition, the switching circuit 55 is able to mix the talk-back signal with a monitor signal.

The second block 6, as shown in FIG. 7, includes a plurality of input adjustment circuits 63, a plurality of filter circuits 64, a matrix mixer 65, a plurality of signal processing circuits 66, and a speaker selector 67.

The second input interface 61 includes a plurality of channels. The second input interface 61, for each channel, outputs a speaker-send (Sp.Snd) signal to the plurality of input adjustment circuits 63 through a speaker-send bus 61A.

Each of the plurality of input adjustment circuits 63 adjusts a signal level of the speaker-send signal received from the second input interface 61 through the speaker-send bus 61A.

The plurality of filter circuits 64 correspond one-on-one to a plurality of input adjustment circuits 63. Each of the plurality of filter circuits 64 performs filter processing to the signal inputted from a corresponding input adjustment circuit 63. Each of the plurality of filter circuits 64, as shown in FIG. 8A, includes an FIR filter 641 and an IIR filter 642. Each of the plurality of filter circuits 64 performs processing of either the FIR filter 641 or the IIR filter 642 on a signal. A user can select either the FIR filter 641 or the IIR filter 642 by operating the operation receiving circuit 102 of the PC 100. As a result, the audio signal processor 1 is able to output a signal on which desired filter processing has been performed for each speaker, to the speaker.

In addition, the matrix mixer 65 includes a 32×32 matrix, for example. In other words, the matrix mixer 65 includes a plurality (32) of input channels, and a plurality (32) of output channels. The matrix mixer 65, as shown in FIG. 7, by mainly mixing the signal inputted from each of the plurality of input channels, outputs the signal to each of the plurality (32) of output channels. The output channels of the matrix mixer 65 correspond one-on-one to the plurality of signal processing circuits 66. The signal outputted from the matrix mixer 65 is outputted to the plurality of signal processing circuits 66.

Each of the plurality of signal processing circuits 66, as shown in FIG. 8B, includes an output level adjustment circuit 661, a delay circuit 662, and an equalizer 663. Each of the plurality of signal processing circuits 66 outputs the signal on which signal processing has been performed, to the speaker selector 67 (see FIG. 7).

The speaker selector 67, as shown in FIG. 7, receives a signal from each of the plurality of signal processing circuits 66. The speaker selector 67 causes the received signal to correspond to a speaker (a speaker set) that is desired by a user or is preliminarily set. The speaker selector 67 outputs a corresponding signal (Sp. Out), to the second output interface 62.

The second output interface 62 outputs the signal (Sp. Out) received from the speaker selector 67, to the routing matrix 7. In addition, the second output interface 62 receives a signal for a monitor (Mon. out) that the speaker selector 67 has received from the second input interface 61 through a monitor bus 68, from the speaker selector 67. The second output interface 62 outputs the signal for a monitor, to the routing matrix 7.

As described above, the audio signal processor 1 according to an embodiment is able to perform various signal processing on a signal. In addition, the audio signal processor 1 according to the present preferred embodiment, by using the routing matrix 7, is able to more flexibly input and output a signal to the first block 5 and the second block 6. In other words, the user can select to use only the first block 5, use only the second block 6, or use both the first block 5 and the second block 6. In other words, the audio signal processor 1 is able to freely input and output a signal according to a different environment for each user, by using an existing user facility which is a side of the first block 5 or using an existing user facility which is a side of the second block 6. Accordingly, the audio signal processor 1 according to an embodiment is able to perform flexible signal processing.

Incidentally, the audio signal processor 1 according to an embodiment is connected to the PC 100. The PC 100 displays an interactive setting screen on the display 101 such as an LCD (not shown). It is to be noted that specific examples of the interactive setting screen include a wizard. The display 101 displays a setting screen on which a user can perform various settings, and an operation screen on which the user can select an input destination, an output destination, and the like. The setting screen and the operation screen include preliminarily installed functions to be started and used by a user.

Figure 9:
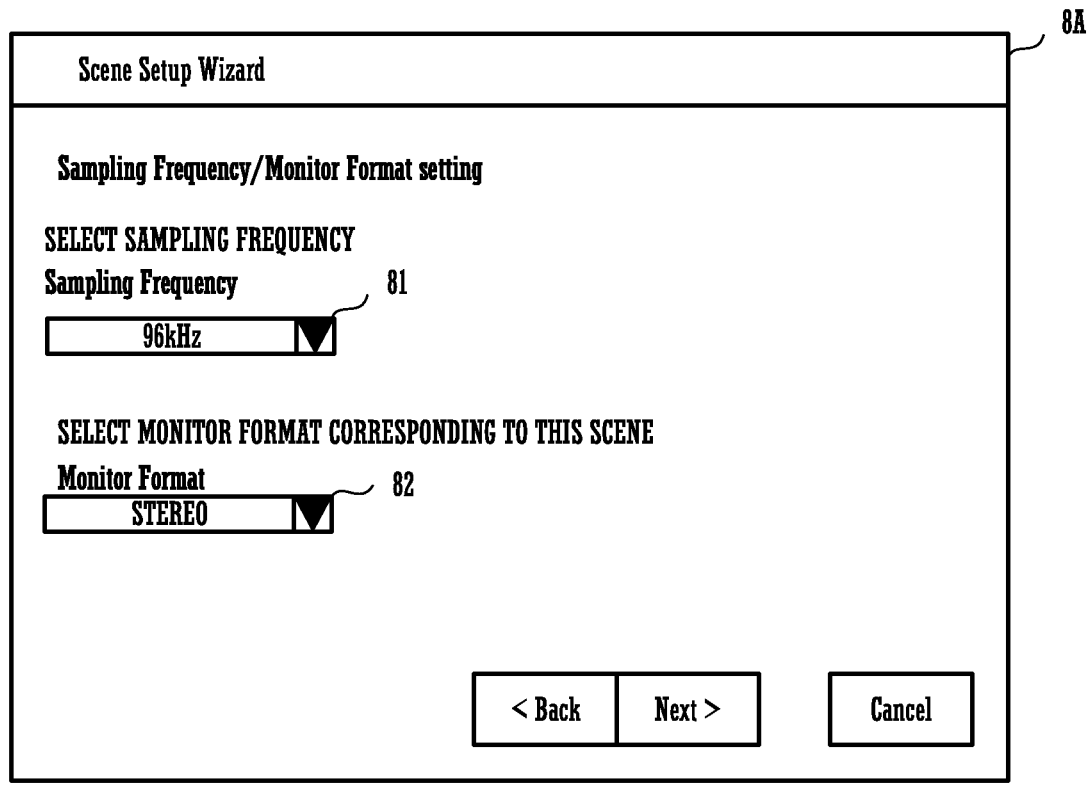
FIG. 9 illustrates an example of a setup setting screen of the audio signal processor.
Figure 10:
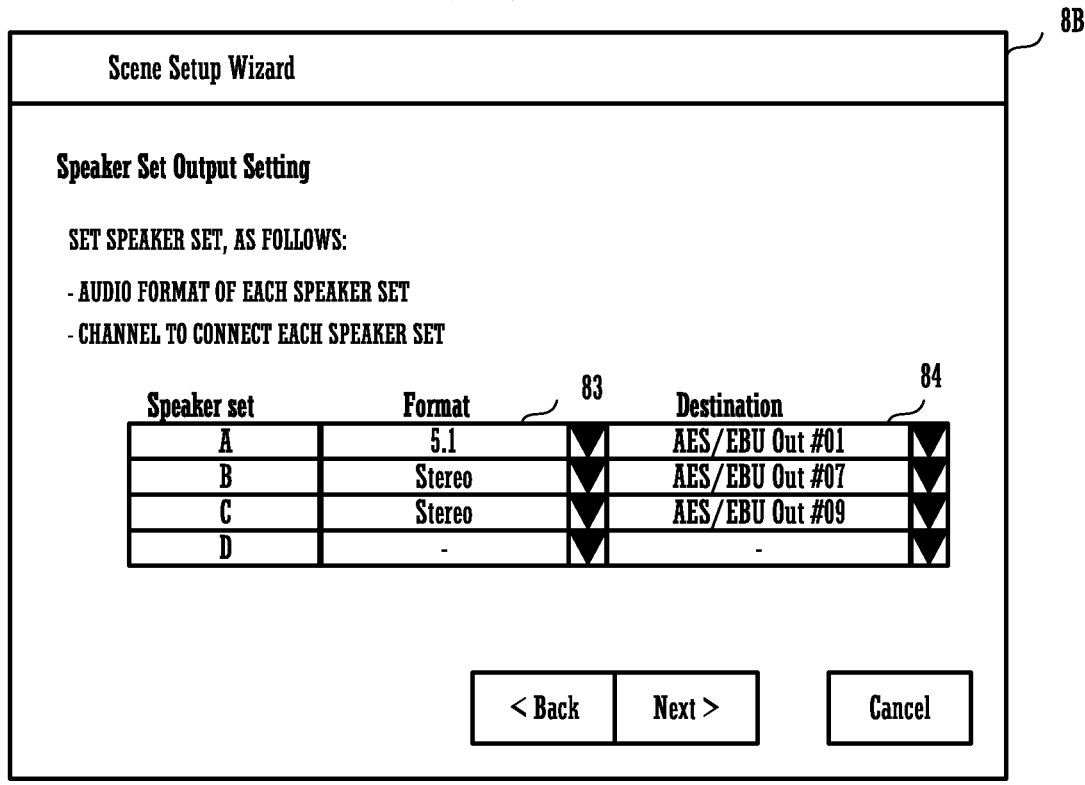
FIG. 10 illustrates an example of a speaker setting screen of the audio signal processor.

The setting screen will be described with reference to FIG. 9 and FIG. 10. FIG. 9 illustrates an example of a setup screen 8A of the audio signal processor 1. FIG. 10 illustrates an example of a speaker setting screen 8B of the audio signal processor 1.

A user uses the PC 100 for each channel control of the first input interface 51 of the first block 5 and the second input interface 61 of the second block 6, and selects various settings and processing. Further, the user uses the PC 100 for each channel control of the first output interface 52 of the first block 5 and the second output interface 62 of the second block 6, and selects various settings and processing.

For example, the CPU (not shown) of the PC 100, as illustrated in FIG. 9, causes the display 101 of the PC 100 to display the setup screen 8A. The user can appropriately select or input a set value, a format, and the like, according to instructions of the setup screen 8A appeared on the screen of the PC 100. For example, the user can select a sampling frequency displayed on the setup screen 8A, from a pull-down menu 81. In addition, for example, the user can select a monitor format displayed on the setup screen 8A, from a pull-down menu 82. It is to be noted that the monitor format refers to a surround sound audio system. The monitor format may be indicated by the number of channels such as 5.1 ch or 7.1.2 ch, for example.

The CPU 31 receives the instructions based on the operation that the operation receiving circuit 102 has received through the control interface 23, and appropriately performs processing. In addition, the user can set speakers (speaker sets) A, B, C, and D to be used, as illustrated in FIG. 10, on the speaker setting screen 8B, for example, so that the speakers may be operated with one touch. The speaker setting screen 8B preliminarily displays the speakers A, B, C, and D. The user can select a format (Format) and a path (Destination) that are displayed on the speaker setting screen 8B for each speaker, from the corresponding pull-down menu 83 and pull down menu 84.

When the user selects 5.1 ch, for example, as the format on the speaker setting screen 8B, the CPU 31 is able to automatically assign a number to the path in order from AES/EBU Out #01, #02, to #03. More specifically, the CPU 31, when the user selects the format, assigns a number in order from the beginning of an unused number. The audio signal processor 1 according to an embodiment facilitates setting since a path (a bus) to be used is automatically assigned when the format is selected by a user.

It is to be noted that, in addition to the speaker setting, the CPU (not shown) of the PC 100 may cause the display 101 to display the setting of a monitor source (such as a sound source or an audio device of an input destination) when a monitor function is selected or the setting of a monitor source and a speaker of an output destination when a cue function is used. In such a case, the CPU 31 receives content (instructions) set on the screen of the display 101 through the control interface 23, and appropriately performs processing.

The audio signal processor 1 displays a setting screen on the screen of the PC 100, so that the user can more easily set various settings. For example, the user, without changing the setting of the matrix mixer 65, can easily change an output destination in the speaker selector 67 only by switching speakers.

Figure 11:
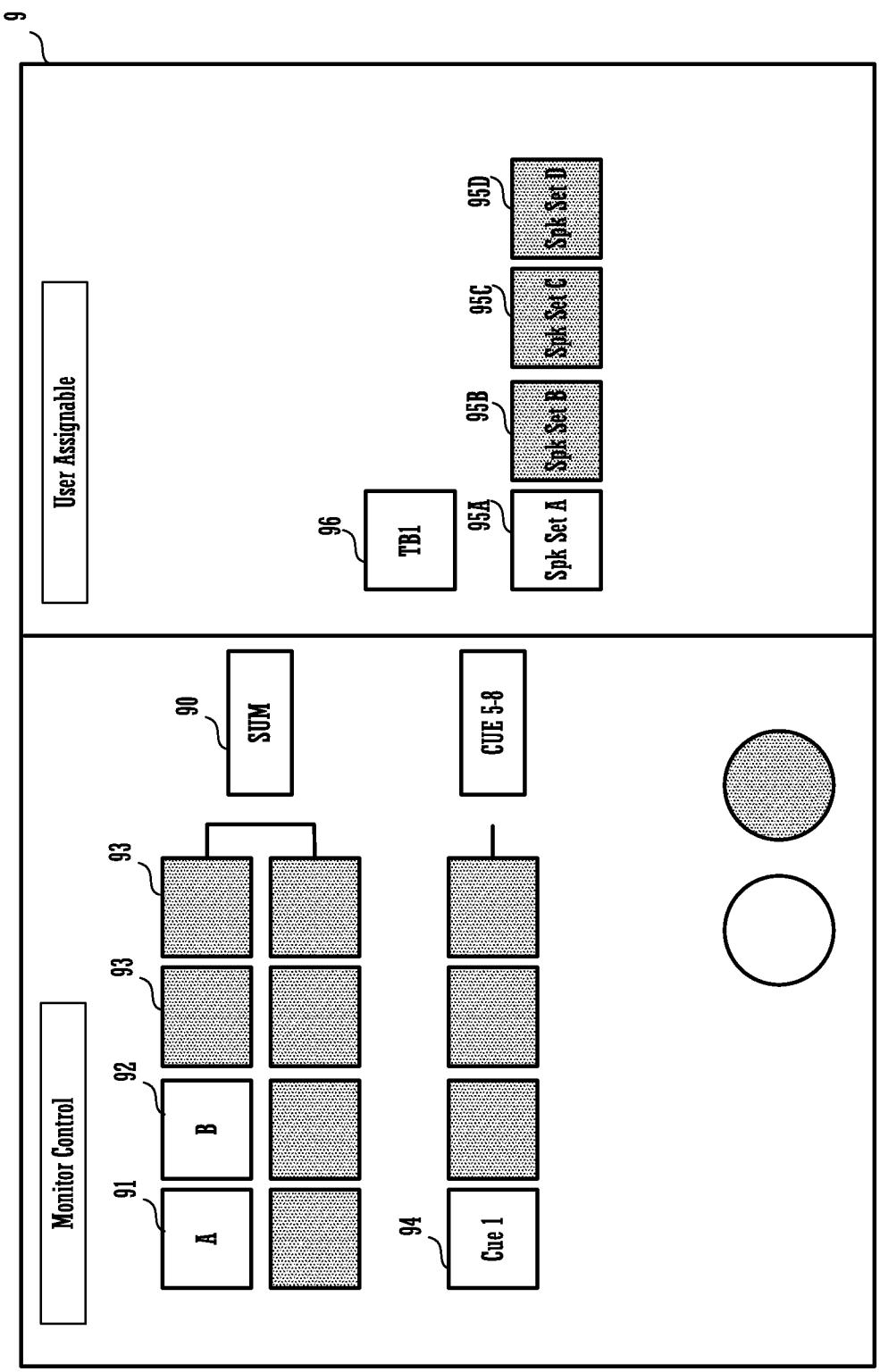
FIG. 11 illustrates an example of an operation screen of the audio signal processor 1.

In addition, an operation screen 9 will be described with reference to FIG. 11. FIG. 11 illustrates an example of the operation screen 9 of the audio signal processor 1. The display 101 displays the operation screen 9 as illustrated in FIG. 11, for example, based on a user operation received from the operation receiving circuit 102. The operation screen 9 can display a path set on the setup screen 8A, the speaker setting screen 8B, or the like.

It is to be noted that the audio signal processor 1, based on the set content, for example, as illustrated in FIG. 11, is also able to display a physical controller on the display 101 so that a sound source of an input destination may be selected. In addition, the user can select a desired interface, that is, at least one of the first input interface 51, the second input interface 61, the first output interface 52, and the second output interfaces 62, for example, by an interface selection operation to select a displayed physical controller. The audio signal processor 1, when the operation receiving circuit 102 receives an operation of the physical controller displayed on the display 101, outputs a signal in the path based on the interface selected by the interface selection operation. The display 101 displays a screen on which at least one of the first input interface 51 and the second input interface 61 is selectable. In addition, the display 101 displays a screen on which at least one of the first output interface 52 and the second output interface 62 is selectable. The user can select on the screen at least one of the first input interface 51 and the second input interface 61, or at least one of the first output interface 52 and the second output interface 62.

Furthermore, physical controllers 91 and 92 illustrated in FIG. 11 display a sound source that is able to be inputted. A physical controller 93 is grayed out and is unselectable. Normally, although the physical controllers 91 and 92 are mutually exclusive, the physical controllers 91 and 92 become simultaneously selectable after a physical controller 90 is pressed. In other words, the user can select two or more sound sources of an input destination.

In addition, the operation screen 9 displays a physical controller 94 of a selectable Cue function. Furthermore, the operation screen 9 displays physical controllers 95A, 95B, 95C, and 95D that indicate a speaker of an effective output destination. When the physical controllers 95A, 95B, 95C, and 95D are selected by pressing or the like by the user, sound is outputted from a selected speaker. On the operation screen 9, the physical controllers (the physical controller 95B, the physical controller 95C, and the physical controller 95D, for example) other than the selected physical controller (the physical controller 95A, for example) are grayed out. In other words, the user can select a desired speaker from the physical controllers 95A, 95B, 95C, and 95D on the operation screen 9, and can switch the speaker. In other words, when the user selects a physical controller, that is, at least one of the physical controllers 95A, 95B, 95C, and 95D, for example, the operation receiving circuit 102 receives a user operation. The controller 3 outputs sound from the desired speaker in the path based on the user operation received from the operation receiving circuit 102, through the control interface 23.

In addition, the operation screen 9 displays a physical controller 96 that indicates an effective talk-back function.

It is to be noted that the display 101 may be provided on the front panel 41 of the housing 4. In such a case, the user can easily set the audio signal processor 1 without using a PC. In addition, the operation receiving circuit 102 may be provided in the housing 4. In such a case, the audio signal processor 1 according to an embodiment is able to perform processing such as setting without being connected to a PC. In addition, the display 101 may be a mobile device (such as a tablet terminal, for example) different from the PC 100.

A method of processing an audio signal will be described with reference to FIG. 12 and FIG. 13. FIG. 12 is a flow chart showing the method of processing an audio signal. FIG. 13 is a flow chart showing the method of processing an audio signal in the first block 5.

The method of processing an audio signal outputs a signal inputted from each of the first output interface 52 of the first block 5 and the second output interface 62 of the second block 6, to each of the first input interface 51 of the first block 5 and the second input interface 61 of the second block 6, through the routing matrix 7.

Hereinafter, the method of processing an audio signal will be described in detail. It is to be noted that the method of processing an audio signal to be described below is just an example, and is not limited to the example. In addition, all selections (settings) are assumed to be selected (set) by a user. For example, whether or not to input a signal to the first input interface 51 of the first block 5 depends on the setting of the user.

The routing matrix 7 receives a signal from a sound source (S11). The routing matrix 7 distributes the signal for each channel according to the setting of a user (S12). The distributed signal is inputted to the first block 5, the second block 6, or an audio device according to the selection (setting) of the user (S13). When the user selects to input the signal to the first input interface 51 of the first block 5, the signal is inputted to the first input interface 51 of the first block 5 (S14). The inputted signal is subjected to signal processing in the first block 5 (S15). The signal to which the signal processing has been subjected is outputted from the first output interface 52 of the first block 5 (S16). Subsequently, the processing proceeds to S12.

In addition, when the user selects to input the signal to the second input interface 61 of the second block 6, the signal is inputted to the second input interface 61 of the second block 6 (S17). The inputted signal is subjected to signal processing in the second block 6 (S18). The signal to which the signal processing has been subjected is outputted from the second output interface 62 of the second block 6 (S19). Subsequently, the processing proceeds to S12.

Furthermore, when the user selects to input the signal to the audio device, the routing matrix 7 outputs the signal to the audio device through the output interface 22 (S20).

The method of processing an audio signal according to an embodiment more flexibly inputs and outputs the signal through the routing matrix 7. As a result, the method of processing an audio signal according to an embodiment is able to perform flexible signal processing, in one structure.

Furthermore, an insertion function in the first block 5 will be described with reference to FIG. 13.

The first block 5 receives a signal for each of the plurality of channel modules 53 through the first input interface 51 (S21). The first block 5 sends the received signal to an external device through the insertion send 537 of the insert bus 53B for each of the plurality of channel modules 53 (S22). The first block 5 receives the signal on which signal processing has been performed by the external device, for each of the plurality of channels, through the insertion return 536 of the insert bus 53B (S23). The first block 5 outputs the signal from the plurality of channel modules 53 (S24).

The method of processing an audio signal according to an embodiment is able to send and receive a signal to and from an external device, for each of the plurality of channel modules 53 in the first block 5, through the insert bus 53B. Accordingly, the method of processing an audio signal according to an embodiment is able to achieve more various types of signal processing.

The embodiments are illustrative in all points and should not be construed to limit the present invention. The scope of the present invention is defined not by the above embodiments but by the scope of the following claims. Further, the scope of the present invention is intended to include all modifications within the scopes of the claims and within the meanings and scopes of equivalents.

What is claimed is:

1. An audio signal processor comprising:
    an input system block including a first input interface, a first output interface, a plurality of channel modules, and a mixing circuit;
    an output system block including a second input interface and a second output interface; and
    a routing matrix that is connected to each of the first input interface, the first output interface, the second input interface, and the second output interface, the routing matrix outputting a signal inputted from each of the first output interface and the second output interface, to each of the first input interface and the second input interface, wherein
    each of the plurality of channel modules outputs a signal on which an effector processing has been performed by each of a plurality of effector processing circuits; and
    the mixing circuit mixes signals received from each of the plurality of channel modules and outputs the mixed signals to the first output interface.

2. The audio signal processor according to claim 1, wherein
    each of the plurality of channel modules includes an input bus to receive a signal from the first input interface.

3. The audio signal processor according to claim 2, wherein each of the plurality of channel modules includes an insert bus connected to the input bus, and the each of the plurality of channel modules sends and receives a signal to and from an external device through the insert bus.

4. The audio signal processor according to claim 2, wherein the input system block outputs a signal either preceding or following the plurality of channel modules through the first output interface.

5. The audio signal processor according to claim 1, wherein
    the output system block includes a filter circuit; and
    the filter circuit executes one of a plurality of filter functions for each inputted signal.

6. The audio signal processor according to claim 1, further comprising:
    a display to display a screen; and
    an operation receiving circuit to receive an operation on the screen.

7. The audio signal processor according to claim 6, wherein the operation receiving circuit receives an interface selection operation in which at least one of the first input interface of the input system block, the second input interface of the output system block, the first output interface of the input system block, and the second output interface of the output system block is selectable.

8. The audio signal processor according to claim 7, wherein
    the display displays a physical controller based on the operation received by the operation receiving circuit; and,
    when the operation receiving circuit receives the operation of the physical controller displayed on the display, a signal is outputted through a path based on the interface selected among the first input interface, the second input interface, the first output interface, and the second output interface by the interface selection operation.

9. The audio signal processor according to claim 6, wherein the display displays a physical controller based on the operation received by the operation receiving circuit.

10. The audio signal processor according to claim 6, wherein
    the operation receiving circuit receives a setting of a speaker set to be used; and
    the output system block assigns a path of an audio device connected to an outside, based on the setting of the speaker set.

11. A method of processing an audio signal, comprising:
    outputting a signal inputted from each of a first output interface of an input system block and a second output interface of an output system block, to each of a first input interface of the input system block and a second input interface of the output system block, through a routing matrix;

outputting a signal on which an effector processing has been performed by each of a plurality of effector processing circuits of the input system block; and mixing signals received from each of a plurality of channel modules of the input system block and outputting the mixed signals to the first output interface.

12. The method of processing an audio signal according to claim 11, further comprising:

receiving a signal from the first input interface for each of the plurality of channel modules of the input system block; and sending and receiving the signal to and from an external device through an insert bus.

* * * * *